United States Patent
Taniguchi et al.

(10) Patent No.: US 6,603,289 B2
(45) Date of Patent: Aug. 5, 2003

(54) VEHICLE ALTERNATOR CONTROL DEVICE AND METHOD

(75) Inventors: Makoto Taniguchi, Kariya (JP); Toshiyo Ogino, Okazaki (JP); Koji Tanaka, Anjo (JP)

(73) Assignee: Denso Corporation, Kariya (JP)

( * ) Notice: Subject to any disclaimer, the term of this patent is extended or adjusted under 35 U.S.C. 154(b) by 76 days.

(21) Appl. No.: 09/978,537

(22) Filed: Oct. 18, 2001

(65) Prior Publication Data

US 2002/0050810 A1 May 2, 2002

(30) Foreign Application Priority Data

Nov. 2, 2000 (JP) ........................................ 2000-336395

(51) Int. Cl.⁷ ................................................. H02P 9/44
(52) U.S. Cl. ............................ 322/28; 322/29; 322/32
(58) Field of Search ............................... 322/19, 28, 29, 322/31, 32, 36

(56) References Cited

U.S. PATENT DOCUMENTS

| | | | | |
|---|---|---|---|---|
| 5,061,889 A | * | 10/1991 | Iwatani et al. ................ 322/28 |
| 5,266,836 A | * | 11/1993 | Sousa ........................... 290/31 |
| 5,429,687 A | | 7/1995 | Goffart ......................... 148/120 |
| 5,497,071 A | * | 3/1996 | Iwatani et al. ................ 322/28 |
| 6,215,285 B1 | * | 4/2001 | Harmon ......................... 322/29 |
| 6,456,048 B2 | * | 9/2002 | Taniguchi et al. ............ 322/28 |
| 6,462,516 B1 | * | 10/2002 | Watanabe ..................... 322/28 |
| 6,483,198 B2 | * | 11/2002 | Schmitz et al. ........... 290/40 C |
| 2002/0000791 A1 | * | 1/2002 | Taniguchi et al. ............ 322/28 |
| 2002/0050810 A1 | * | 5/2002 | Taniguchi et al. ............ 322/28 |

FOREIGN PATENT DOCUMENTS

JP    U 62-44698    3/1987
JP    A 6-292329    10/1994

* cited by examiner

*Primary Examiner*—Nicholas Ponomarenko
(74) *Attorney, Agent, or Firm*—Oliff & Berridge, PLC

(57) ABSTRACT

A vehicle alternator control device has a power transistor, a flywheel diode, a voltage control circuit, a primary power supply circuit, and a secondary power supply circuit. When the alternator starts rotation, the secondary power supply circuit drives the primary power supply circuit when the alternator speed reaches a frequency equivalent to a speed higher than an engine idling speed. When the engine stops and the speed of the alternator drops, the secondary power supply circuit stops the primary power supply circuit when the alternator speed reaches a frequency equivalent to a speed below the engine idling speed.

9 Claims, 5 Drawing Sheets

VEHICLE ALTERNATOR CONTROL DEVICE AND METHOD

CROSS REFERENCE TO RELATED APPLICATION

This application is based on and incorporates herein by reference Japanese Patent Application No. 2000-336395 filed on Nov. 2, 2000.

BACKGROUND OF THE INVENTION

The present invention relates to a vehicle alternator control device and method for controlling the electric power generating operation of an alternator for vehicles.

In an alternating current generator (alternator), a small alternating current (a.c.) voltage is generated in each armature coil even when a rotor is turned without being supplied with a field current to the field coil. This is because residual flux remains in the field poles of the rotor.

In JP-U-62-44698, a control circuit is provided to detect if a rotor of an alternator starts to turn, that is, if a vehicle engine is started, by detecting the frequency of the induced voltage of the armature coil as a result of residual magnetization in the field poles of the rotor. The control circuit starts supplying a field current to the field coil when the engine is detected to have started. By thus detecting that the engine has started based on the voltages induced in the armature coil, the signal wire from the vehicle used to indicate the on/off state of an ignition switch can be eliminated, and the wiring can therefore be simplified.

However, there is a significant difference between when the engine is starting (cranking) and when the engine is stopping in the residual magnetization of the field poles and behavior when the engine is turning. Therefore, the engine rotation cannot be detected with sufficient precision if the same frequency is used to detect when rotation starts and when rotation stops.

In general, the voltage signal appearing in the armature coil when the engine starts is extremely weak because it results only from the residual flux in the field poles. If the flux linkage to the armature coil is constant, the amplitude and frequency of the voltage induced in the armature coil are proportional to the speed of the rotor. This frequency can be detected by digitizing the voltage signal in the armature coil using a voltage comparator or other means and then applying a specific digital operation.

To detect the rotor speed using the weak signal resulting from the residual flux, the reference voltage used for comparison by the voltage comparator must be set to a low voltage. If this reference voltage is too low, detection errors will arise due to noise or other external signals. It is therefore necessary to set the reference voltage of the voltage comparator high enough so that the comparison will not be influenced with the external noises. However, if the reference voltage of the voltage comparator is too high, a digital pulse cannot be generated until the induced voltage of the armature coil becomes high enough, and the detectable rotor speed thus rises.

After the engine is started with a starter and the engine is firing normally, it reaches an idling speed after the engine speed rises to a specific level. The engine starting can be detected even if the frequency used to detect the speed is set relatively high. Particularly in winter when the ambient temperature is low, the engine is controlled to start at a higher initial idling speed than in warm weather in order to warm up the engine quickly.

However, if the engine start detection speed is set higher than a speed equivalent to the normal idling speed setting, it may not be possible to sustain power generation when the engine is idling, such as when waiting at a traffic signal.

It is proposed to avoid this problem that the number of turns of the armature coil can be increased in order to lower the speed at which current generation starts. However, this results in a drop in the output current at high engine speeds and hence is not a good solution because the balance between charging and discharging a vehicle battery is impaired.

JP-A-6-292329 proposes to change coils according to the speed. However, this is not a practical solution, because the circuit scale then becomes large.

U.S. Pat. No. 5,429,687 proposes to improve magnetic characteristics by heat treating the field poles and using magnetic annealing causing a transition to a crystalline phase that increases the residual flux. However, heat treatment of the field poles with high heat capacity requires a large scale heat treatment system.

SUMMARY OF THE INVENTION

The present invention addresses these problems, and has an object to provide a vehicle alternator control device that can improve precision of engine speed detection without increasing circuit scale or impairing battery charge-discharge balance.

According to the present invention, a vehicle alternator control device starts an operating voltage supply operation when the frequency of an a.c. output voltage of an alternator is greater than a first reference frequency, and stops the operating voltage supply when the frequency of the a.c. output voltage drops below a second reference frequency lower than the first reference frequency. Detection errors due to noise can be prevented and detection precision can be improved because engine start detection uses a high frequency corresponding to the first reference frequency.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

A vehicle alternator control device according to the present invention will be described with reference to preferred embodiments.

First Embodiment

Figure 1:
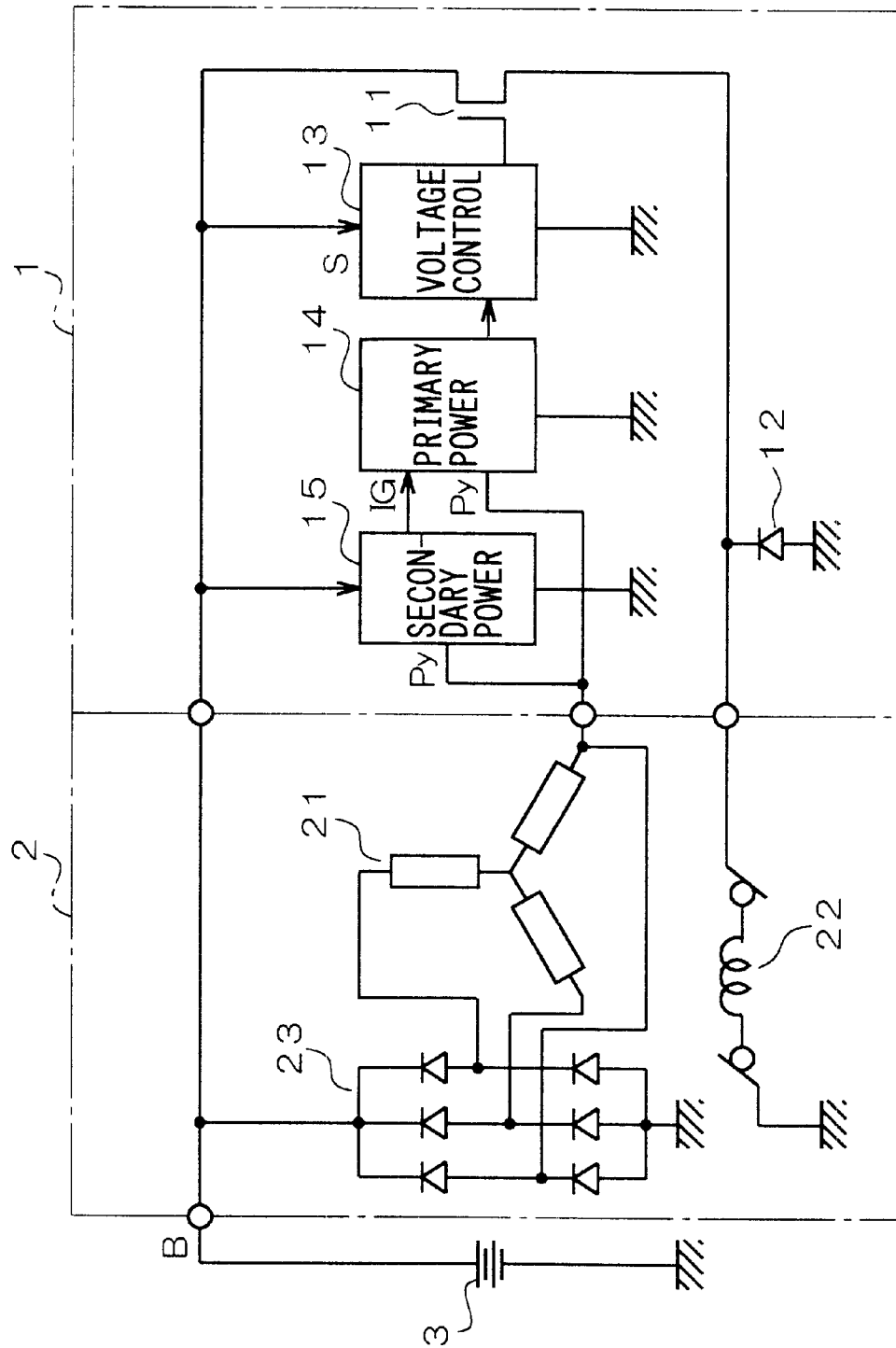
FIG. 1 is a circuit diagram showing a vehicle alternator control device according to a first embodiment of the present invention.

Referring first to FIG. 1, a vehicle alternator control device 1 is provided to control the output voltage of an alternator 2 within a specified range. The alternator 2 comprises three-phase armature coils 21 in a stator (not shown), a field coil 22 in a rotor (not shown) and a full-wave rectifier circuit 23 for full-wave rectification of the three-phase outputs from armature coils 21. The alternator 2, particularly the rotor, is driven by an engine (not shown). Controlling the output voltage of the alternator 2 is accomplished by adjusting the field current to the field coil 22 by the alternator control device 1. An output terminal (terminal B) of the alternator 2 is connected to a vehicle battery 3 and other electrical loads (not shown) to supply electric current from the alternator 2.

The vehicle alternator control device 1 includes a power transistor 11 connected in series with the field coil 22 as a first switching means for supplying and shutting off the field current; a flywheel diode 12 connected in parallel to the field coil 22 for flywheeling the field current when the power transistor 11 is turned off; a voltage control circuit 13 for monitoring the output voltage of the alternator 2 and controlling the on/off state of the power transistor 11 so that this output voltage is regulated within a specified range; a primary power supply circuit 14 for supplying electric power to maintain the operating state of the voltage control circuit 13; and a secondary power supply circuit 15 for detecting when the rotor of the alternator 2 turns, that is, when the engine rotates, based on an a.c. voltage of the y-phase (the y-phase voltage Py, for example) of the armature coil 21 to drive the primary power supply circuit 14.

Figure 2:
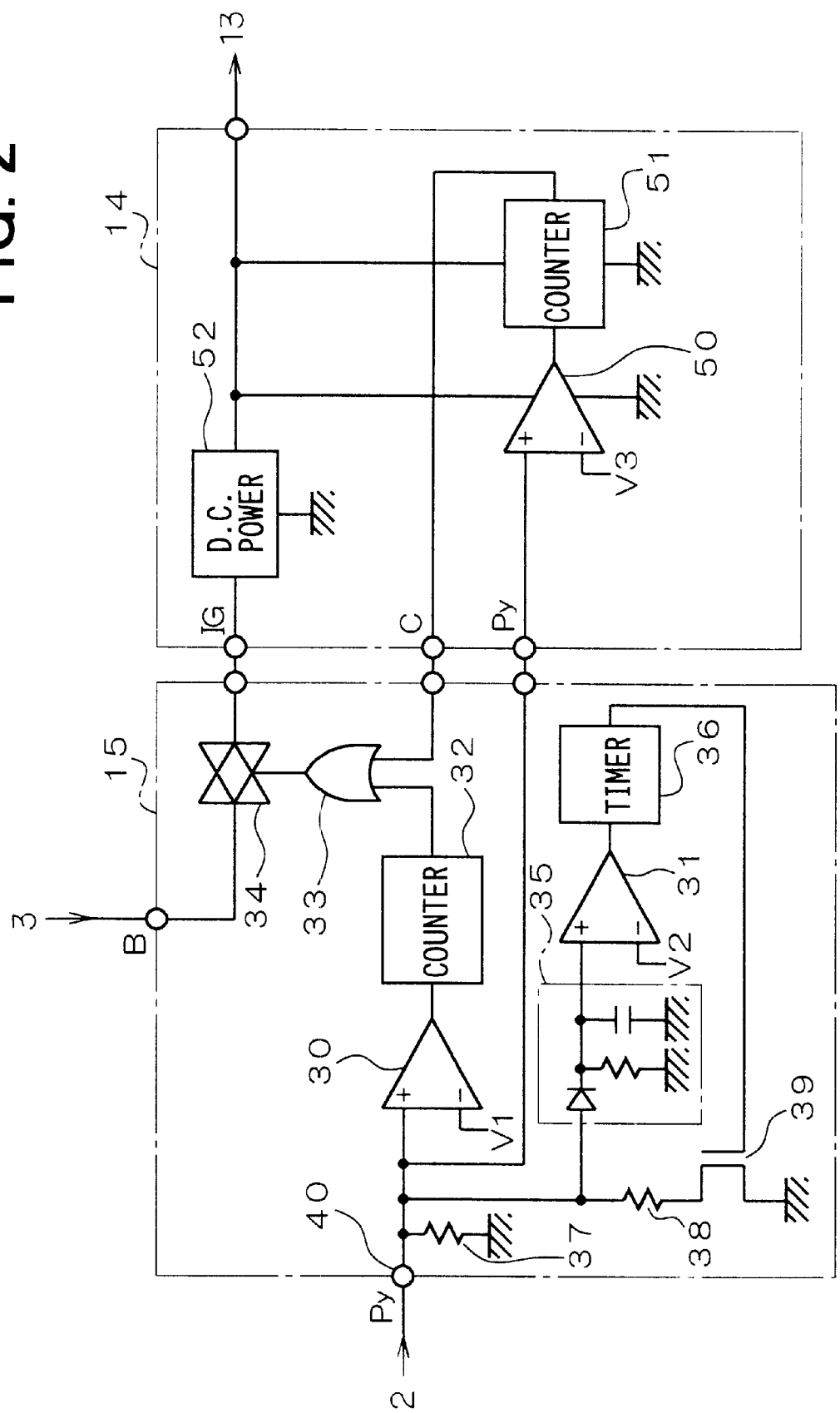
FIG. 2 is a circuit diagram showing a primary power supply circuit and a secondary power supply circuit in the first embodiment.

As shown in FIG. 2, the secondary power supply circuit 15 comprises voltage comparators 30 and 31, a counter circuit 32, an OR gate 33, an analog switch 34, a peak detector circuit 35, a timer circuit 36, resistors 37 and 38, and a transistor 39. The voltage comparator 30 generates a pulse signal according to the rotation speed of the alternator 2 by comparing and digitizing the y-phase voltage Py applied to an input terminal 40 with a specific reference voltage V1. The counter circuit 32 counts the pulse signals output from the voltage comparator 30. When the pulse count reaches a specific count N1, the output level inverts.

The transistor 39, which is a MOSFET for example, is a second switching means for taking the leakage current in the armature coil 21 or full-wave rectifier circuit 23 to ground. The resistor 38 is connected between the input terminal 40 and transistor 39, and has a resistance lower than that of the resistor 37 connected between the input terminal 40 and ground.

The peak detector circuit 35 detects the wave peak of the y-phase voltage Py applied to the input terminal 40, and includes a diode, a capacitor and a resistor. The voltage comparator 31 compares the peak of the y-phase voltage Py detected by the peak detector circuit 35 with a specific reference voltage V2 to determine if the peak value is greater than this specific the reference voltage V2. This reference voltage V2 is lower than the reference voltage V1 applied to the voltage comparator 30.

The timer circuit 36 operates for a specific time period only when the y-phase voltage Py peak exceeds the reference voltage V2. The signal output from timer circuit 36 is input to the gate of the transistor 39, and controls the transistor 39 to turn on only while the timer circuit 36 is operating so that the leakage current flowing into the input terminal 40 is drained to ground.

The analog switch 34 applies an operating voltage IG to the primary power supply circuit 14, and is on/off-controlled by the output of the OR gate 33. The output signal from the counter circuit 32 and a specific signal (described below) output from the primary power supply circuit 14 are input to the OR gate 33, which outputs the logical sum of these two input signals to the control terminal of the analog switch 34.

The primary power supply circuit 14 has a voltage comparator 50, a counter circuit 51, and a direct current (d.c.) power supply circuit 52. The voltage comparator 50 outputs a pulse signal according to the rotation speed of the alternator 2 by comparing and digitizing the y-phase voltage Py with a specific reference voltage V3. This reference voltage V3 is set, for example, to the same voltage as the reference voltage V1 applied to the voltage comparator 30 in the secondary power supply circuit 15. The counter circuit 51 counts the pulses output from the voltage comparator 50, and the output logic inverts when the count reaches a specific count N2. This specific count N2 is set to a value less than the specific count N1 used by the counter circuit 32 in the secondary power supply circuit 15.

The d.c. power supply circuit 52 generates the operating voltage of the voltage control circuit 13 and smoothes the terminal B voltage passed through the analog switch 34 in the secondary power supply circuit 15. The d.c. power supply circuit 52 also functions to remove a.c. ripple component and noise from the output voltage of the alternator 2 applied to the battery 3 from the terminal B when the alternator 2 is in power generating operation.

The voltage control circuit 13 corresponds to the voltage control means, the primary power supply circuit 14 to the power supply means, and the secondary power supply circuit 15 to the power supply control means, respectively.

Figure 3:
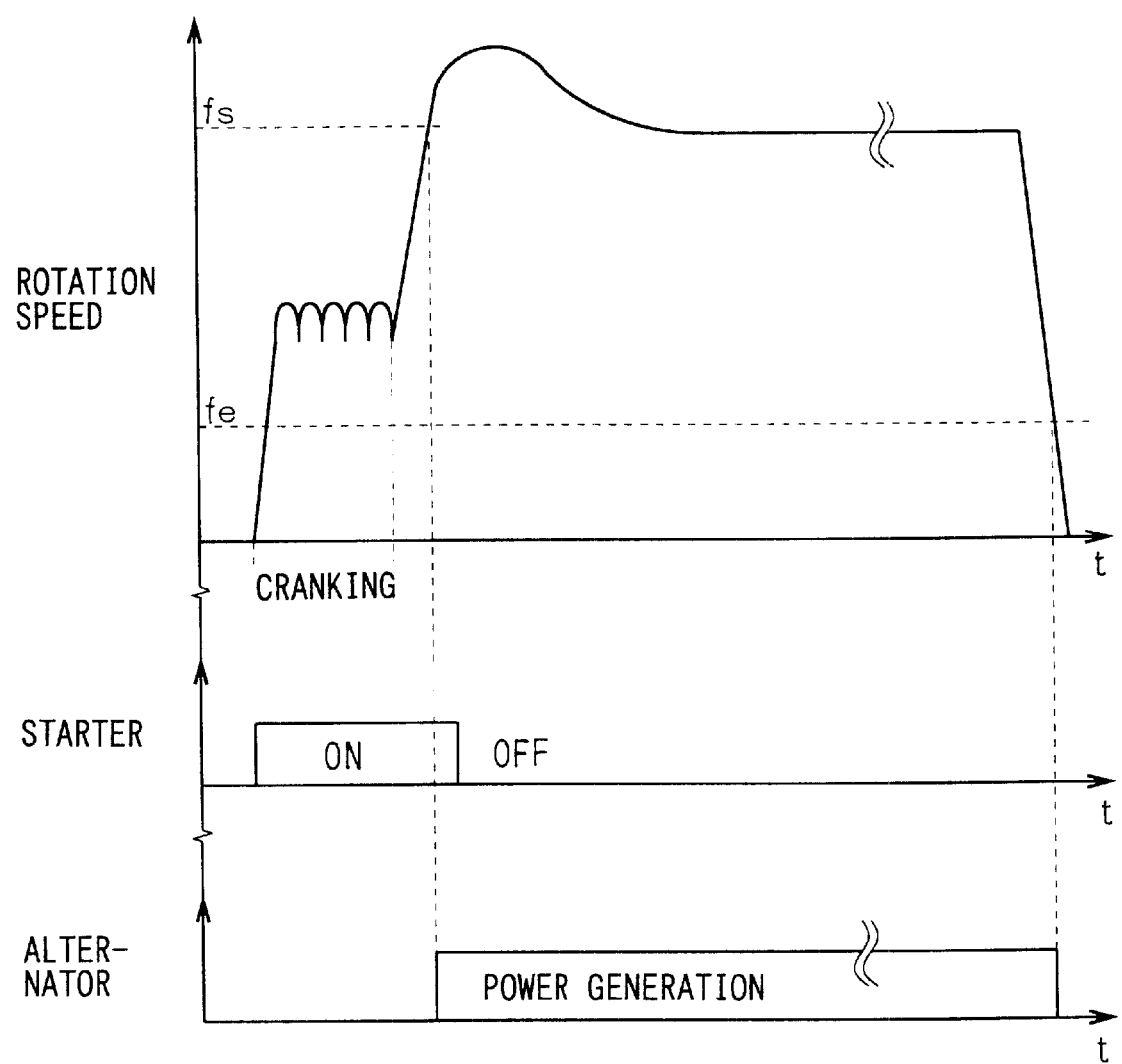
FIG. 3 is a timing diagram showing electrical power generation in the first embodiment.

The vehicle alternator control device 1 according to this embodiment operates as shown in FIG. 3.

When an engine starter (not shown) is driven to start the engine and the alternator 2 begins turning, the amplitude of the y-phase voltage Py applied to the input terminal 40 the of secondary power supply circuit 15 gradually increases. When the amplitude of the y-phase voltage Py exceeds the reference voltage V1 applied to the negative terminal of voltage comparator 30, the voltage comparator 30 generates and outputs to the counter circuit 32 a specific pulse signal with the frequency proportional to the rotation speed of the alternator 2.

As a result of this operation, the output level of the counter circuit 32 changes from low to high when the pulse count input to the counter 32 within a the specific period exceeds specific count N1, that is, when the speed of the alternator 2 reaches a frequency fs equivalent to this specific count N1, the analog switch 34 therefore turns on. The voltage applied from battery 3 through the terminal B of the alternator 2 is supplied to the d.c. power supply circuit 52 in the primary power supply circuit 14, and the voltage control circuit 13 starts controlling the output voltage of the alternator 2.

It is noted that even when the alternator 2 has not started turning, leakage current to the armature coil 21 or full-wave rectifier circuit 23 produces a d.c. drift voltage. The voltage appearing at the input terminal 40 of the secondary power supply circuit 15 rises. The peak detector circuit 35 detects the voltage at the input terminal 40. If this detected voltage exceeds a specific reference voltage V2, the voltage comparator 31 output changes from low to high, thereby starting the timer circuit 36 and causing the transistor 39 to turn on for the specific period. Therefore, because the input terminal 40 of the secondary power supply circuit 15 changes to ground through the resistor 38 and the d.c. drift voltage appearing at the input terminal 40 as a result of the leakage current is suppressed, the voltage at the input terminal 40 drops again and stabilizes at a potential substantially equal to ground.

As a result, the voltage appearing at the input terminal 40 will not exceed the reference voltage V1 applied to the voltage comparator 30, and the analog switch 34 remains in the off position. It should be noted that if the speed of the alternator 2 actually rises, the voltage at the input terminal 40 rises, and the transistor 39 turns on for the specific period. Thus, the voltage at the input terminal 40 will continue to rise and the analog switch 34 will turn on when the speed of the alternator 2 reaches the specific frequency fs.

When the alternator 2 actually starts turning and the analog switch 34 turns on, the d.c. power supply circuit 52 in the primary power supply circuit 14 starts operating. As a result, the d.c. power supply circuit 52 supplies the operating voltage to the voltage comparator 50 and counter circuit 51, to cause them to then start operating. Because the specific count N2 that is the reference for inverting the output of the counter circuit 51 is set to a value less than the specific count N1 set for the counter circuit 32 in the secondary power supply circuit 15, which operates to switch the analog switch 34 from off to on when the alternator starts turning, the counter circuit 51 output remains high and the analog switch 34 stays turned on as long as the rotation speed of the alternator 2 is above the low frequency fe equivalent to the specific count N2.

That is, because the d.c. power supply circuit 52 in the primary power supply circuit 14 does not operate during the engine is being started, the counter 51 does not operate either yet. The primary power supply circuit 14 starts operating when the speed reaches the frequency fs equivalent to the specific count N1 set for the counter circuit 32 in the secondary power supply circuit 15.

When the engine stops and the rotation speed drops below the frequency fs equivalent to this specific count N1, the output level of counter circuit 51 still stays high and the primary power supply circuit 14 continues operating. The primary power supply circuit 14 therefore continues operating even when the speed of the alternator 2 drops below the frequency fs equivalent to the specific count N1, and power supply to the battery 3 and other electrical loads is not interrupted. The power transistor 11 is controlled at this time by the voltage control circuit 13 to supply the field current to the field coil 22, induction voltage due to the magnetization is produced in the y-phase of the armature coil 22 and is easily digitized by the voltage comparator 30 to produce the pulse signal.

When the alternator 2 slows further and the speed drops below the frequency fe equivalent to the specific count N2 of counter circuit 51, the counter circuit 51 output changes from high to low, the signal input to the control terminal of the analog switch 34 changes to low, and the analog switch 34 turns off. The primary power supply circuit 14 therefore stops operating, field current supply to the field coil 22 stops, and power supply to the battery 3 and other electrical loads stops.

The vehicle alternator control device 1 according to this embodiment can thus prevent detection errors due to noise and improve detection accuracy because the high frequency fs is used for detection when the engine starts. More particularly, an increase in the circuit scale is not incurred because switching coils is not necessary, and the charge-discharge balance is not degraded because it is not necessary to increase the number of armature coil coils.

Furthermore, because the time constant of the field coil 22 of the alternator 2 is several hundred milliseconds, the time period from when slowing of the alternator 2 is detected to when the field current flow stops is generally longer than the time period from when the ignition switch is turned off to when the engine completely stops. It is therefore possible to control the power generating state of the alternator 2 without stopping the power supply from the alternator 2 during engine operation, and the signal wire needed to pass the ignition switch position to the vehicle alternator control device can be eliminated.

More particularly, the frequency fs for detecting engine starting is preferably set to less than approximately twice the threshold speed of the full excitation state of the alternator 2, and the frequency fe for detecting engine stopping is set to less than the threshold speed of the alternator 2. Here, the threshold speed is set to correspond to a rotation speed where the alternator 2 starts its power generation. Using these settings makes it possible to prevent detection errors due to noise when the engine starts, prevent erroneously detecting that the engine stopped when the engine is idling, and reliably continue supplying power to the battery and other electrical loads while the engine is running.

Second Embodiment

Figure 4:
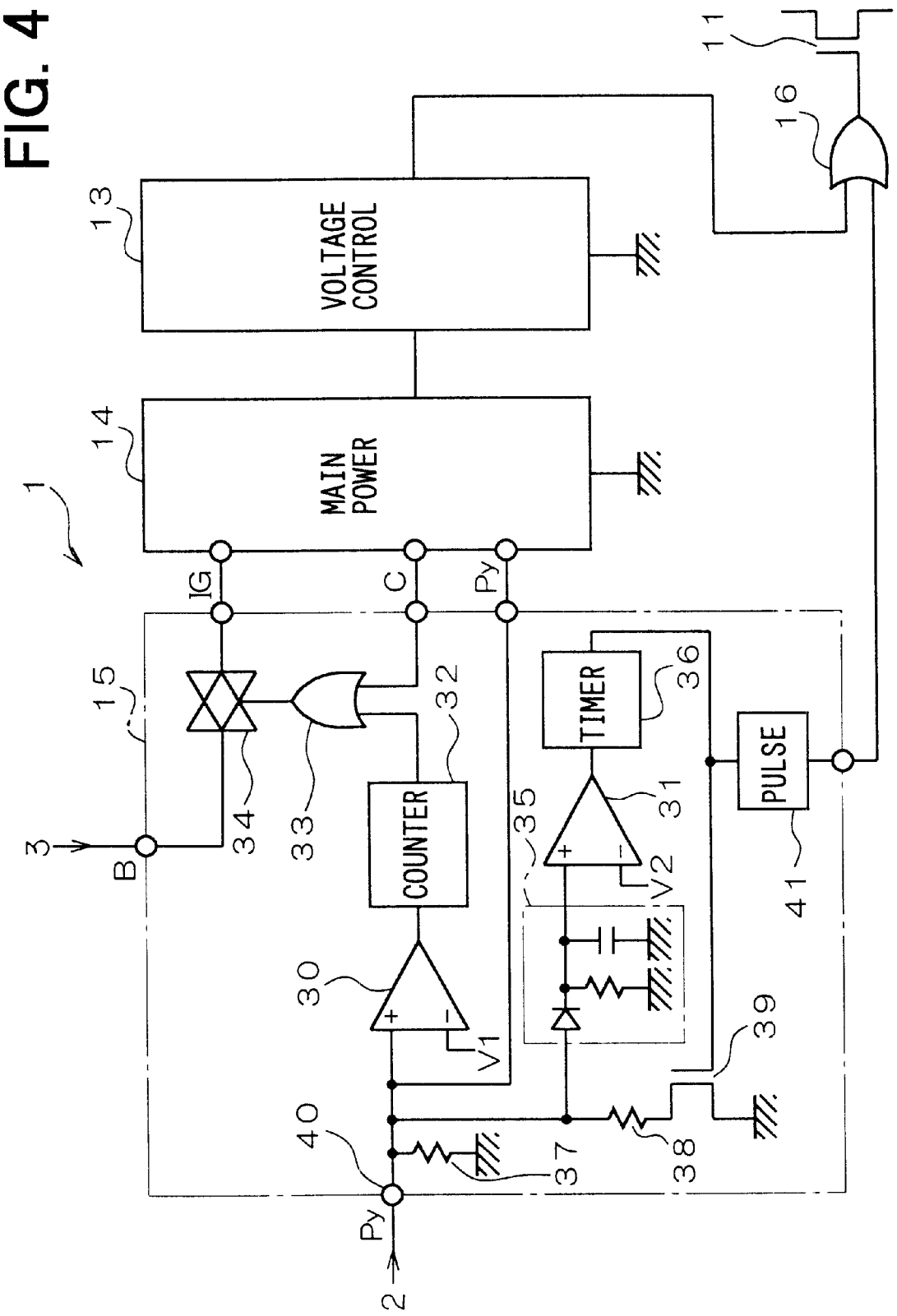
FIG. 4 is a circuit diagram showing a vehicle alternator control device according to a second embodiment of the present invention.

A vehicle alternator control device 1 according to the second embodiment shown in FIG. 4 differs from the vehicle alternator control device 1 shown in FIG. 1 in that an OR gate 16 is added between the power transistor 11 and the voltage control circuit 13. Further, the secondary power supply circuit 15 additionally has a pulse generator 41 on the output side of the timer circuit 36.

The pulse generator 41 generates a pulse signal with a specific period when the timer circuit 36 operates and controls the transistor 39 to the on state. This pulse signal is input through the OR gate 16 to the gate of the power transistor 11. This pulse generator 41 corresponds to the field current supply means. Therefore, when the voltage of the input terminal 40 in the secondary power supply circuit 15 rises to the reference voltage V2, the pulse signal generated by the pulse generator 41 controls the power transistor 11 intermittently on, and the field current flows temporarily to the field coil 22. The voltage induced in the y-phase of the armature coil 21 can thus be amplified, and engine starting can be easily and reliably detected.

Third Embodiment

Figure 5:
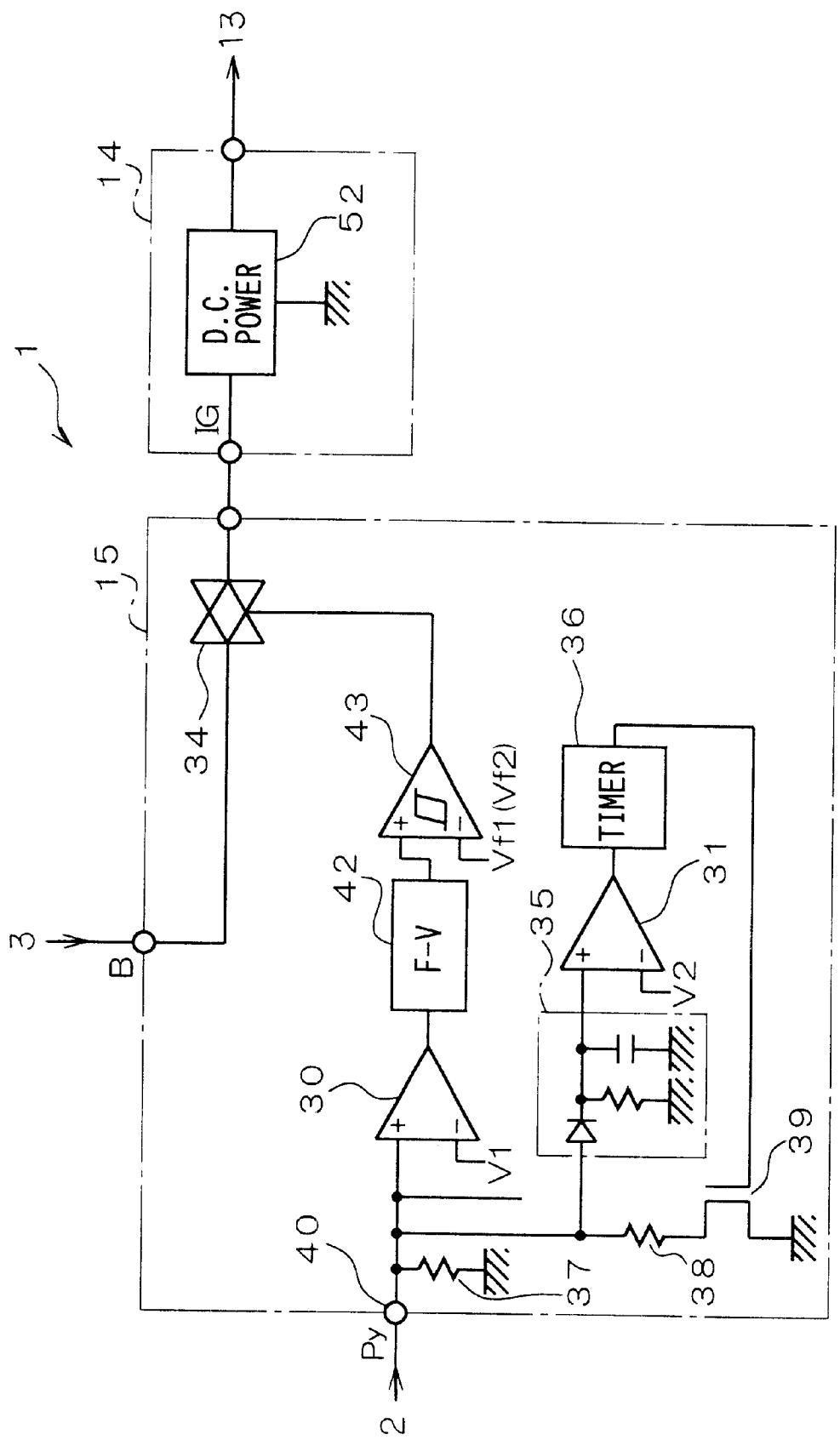
FIG. 5 is a circuit diagram showing a vehicle alternator control device according to a third embodiment of the present invention.

A vehicle alternator control device 1 according to the third embodiment shown in FIG. 5 differs from the vehicle alternator control device 1 shown in FIG. 1 in that the secondary power supply circuit 15 has a frequency-to-voltage (F-V) converter 42 and a voltage comparator 43.

The converter 42 converts the frequency of the input pulse signal to a voltage. Therefore, the output voltage of converter 42 rises as the speed of the alternator 2 increases, and conversely the output voltage of the converter 42 decreases as the speed of the alternator 2 decreases. The voltage comparator 43 has hysteresis and the output changes from low to high when the output voltage of converter 42 rises to a first reference voltage Vf1 or above. In addition, when the output voltage of converter 42 drops and reaches a second reference voltage Vf2 that is lower than the first reference voltage Vf1, the output of voltage comparator 43 changes from high to low.

The reference voltages Vf1 and Vf2 may correspond to the frequencies fs and fe in FIG. 3. As a result, a relatively high speed is set for detecting engine starting. When the speed of the alternator 2 exceeds this high speed setting, field current supply by the vehicle alternator control device 1 starts. On the other hand, a lower speed is set for detecting engine stopping. When the speed of the alternator 2 drops below this low speed setting, the vehicle alternator control device 1 stops supplying the field current.

By thus providing the voltage comparison operation of the voltage comparator 43 in the secondary power supply circuit 15 with hysteresis, it is not necessary to provide the voltage comparator 50 and counter circuit 51 in the primary power supply circuit 14, and the circuit design can be simplified.

The present invention should not be limited to the disclosed embodiment, but may be implemented in many other ways without departing from the spirit of the invention.

What is claimed is:

1. A vehicle alternator control device comprising:

voltage control means for controlling an output voltage of a vehicle alternator by turning on and off a first switching means connected in series with a field coil of the alternator; and power supply means for supplying the operating voltage of the voltage control means; and power supply control means for starting an operating voltage generating operation of the power supply means when a frequency of a phase voltage of an armature coil of the alternator exceeds a first reference frequency, and stopping the operating voltage generating operation of the power supply means when the phase voltage frequency drops below a second reference frequency that is lower than the first reference frequency.

2. A vehicle alternator control device as set forth in claim 1, wherein:

the first reference frequency is less than twice a threshold speed under a full excitation state of the alternator; and the second reference frequency is less than the threshold speed.

3. A vehicle alternator control device as set forth in claim 1, further comprising:

second switching means provided between a reference potential side of a vehicle battery and a terminal for detecting the phase voltage; and switching control means for controlling the second switching means to an on state for only a specific time when the phase voltage exceeds a reference voltage.

4. A vehicle alternator control device as set forth in claim 3, further comprising:

field current supply means for supplying a field current to the field coil when the switching control means controls the second switching means to the on state.

5. A vehicle alternator control method for an alternator having an armature coil and a field coil, and switching means for controlling a field current supply to the field coil thereby to regulate an output voltage of the armature coil, the method comprising steps of:

detecting a frequency of the output voltage of the armature coil;

starting the field current supply to the field coil after the detected frequency rises to a first reference frequency; and stopping the field current supply to the field coil after the detected frequency drops below a second reference frequency which is lower than the first reference frequency.

6. A vehicle alternator control method as set forth in claim 5, further comprising a step of:

lowering the output voltage of the armature coil for a predetermined time period after a start of rotation of the rotor.

7. A vehicle alternator control method as set forth in claim 6, wherein:

the frequency detecting step compares the output voltage of the armature coil with a first reference voltage to detect the frequency; and the lowering step compares a peak of the output voltage of the armature coil with a second reference voltage which is lower than the first reference voltage to control a voltage lowering operation.

8. A vehicle alternator control method as set forth in claim 6, further comprising a step of:

effecting the field current supply to the field coil during the predetermined time period before the field current supply to the field coil is started by the starting step.

9. A vehicle alternator control method as set forth in claim 5, wherein the first reference frequency and the second reference frequency are higher and lower than a predetermined frequency which corresponds to an idle speed of an engine, respectively.

* * * * *